Patented Oct. 18, 1932

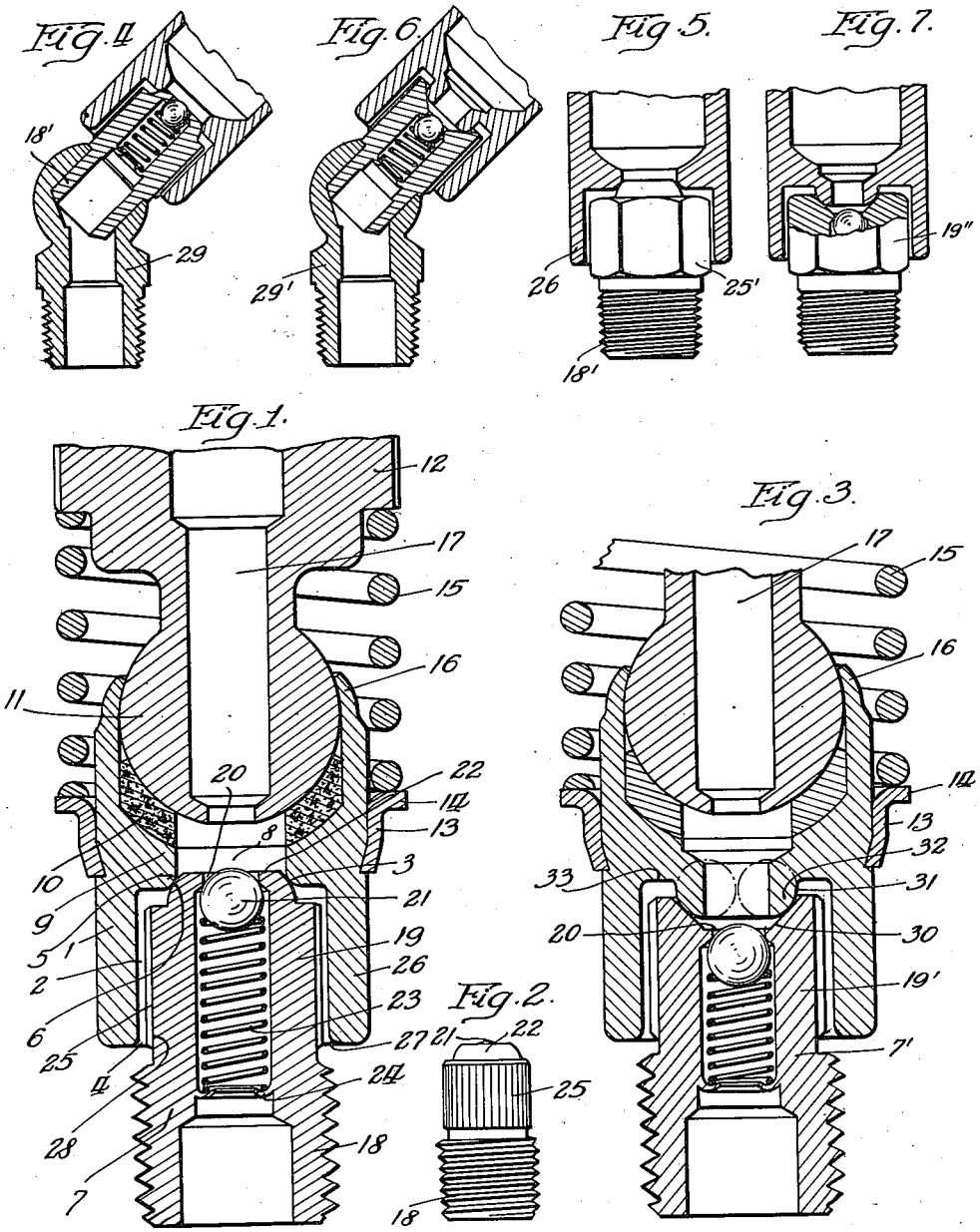

1,883,279

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING COUPLER

Application filed October 21, 1929. Serial No. 401,279.

My invention relates to lubricating couplers, and more particularly relates to lubricating appliances of the class adapted for the communication of lubricant under pressure from a lubricant gun, or other source of lubricant under pressure to bearings of mechanisms, such as the chassis bearings of automotive vehicles, the bearings of industrial machines, and the like.
In the lubrication of such bearings, two general types of apparatus are commonly used: First, apparatus of the interlocking type wherein a separable coupling is employed for the purpose of temporarily relatively rigidly interlocking a nozzle of the lubricant dispensing apparatus, such as a lubricating gun, with a lubricant receiving nipple which is installed on an element of the bearing to be lubricated; second, apparatus of the contact type, wherein the nozzle and nipple are not substantially rigidly interlocked, but are simply held in lubricant communicating contact by manual effort exerted to press the nozzle against the nipple.
My present invention, I believe, has a more general and useful application to lubricating apparatus of the so-called contact type, and is largely directed to the provision of improved lubricating apparatus of the contact type.

Reference may advantageously be had to my copending application, Serial No. 396,-352 filed September 30, 1929, now Patent Number 1,748,817, granted Feb. 25, 1930, (Case 11) wherein is related the problems attending the manufacture, maintenance, and use of lubricating apparatus of the contact type, previously employed, and the difficulties in achieving satisfactory results in the practical use of such apparatus, and for a disclosure of certain improvements in lubricating apparatus, related to the improvements of my present invention.

In my said copending application, a nozzle and nipple construction is disclosed wherein a posteriorly disposed portion of a tubular inlet for the nipple is engaged by a tubular end of the nozzle telescoped over the nipple and guided thereby, to establish a lubricant sealing contact between the nozzle and nipple, and wherein reliance is had upon engagement of spaced coaxial surfaces of the nozzle and nipple to arrest movements of the nozzle and the nipple, as in prior constructions, and effect loss of lubricant between the nozzle and nipple surfaces; my present invention relates to improved apparatus for performing a corresponding function.

As in my said copending application, also, I preferably provide, in connection with the apparatus of my present invention, additional means for effecting that additional degree of angularity of the lubricant gun relative to the nipple which is sometimes desirable in the lubrication of nipples disposed in relatively inaccessible positions on a mechanism.

An object, therefore, of my invention is to provide for widely variant angular positioning of the body of the lubricant gun relative to a nipple, at the same time permitting a good lubricant sealing contact to be effected by manual pressure between the gun nozzle and the nipple, under improved conditions requiring but relatively slight variance in axial angularity between the nozzle itself and the nipple associated therewith.

Another object of my invention is to provide an improved manually maintainable nozzle and nipple coupler mechanism of the contact type.

Another object of my invention is to provide coupler mechanism of the general type disclosed in my said copending application, but wherein greater variance in axial angularity between the nozzle itself and the nipple associated therewith, may advantageously be effected.

Another object of my invention is to provide apparatus for a lubricating system susceptible of being manufactured in quantities, and which involves the combination of an improved nipple with the dispensing nozzle of a lubricating mechanism according to a new method whereby objectionable and improper operation is avoided.

Another object of my invention is to provide an improved coupler, comprising a nozzle and nipple, the nipple being of very inexpensive construction, in which the surface adapted for engagement by a tool to apply the nipple to or remove the nipple from an element of a bearing, is also employed for engagement by an enveloping portion of the nozzle to arrest excessive angular movements of the nozzle relative to the nipple during a lubricating operation.

Another object of my invention is to provide improved lubricating apparatus including a nozzle and nipple of the contact type so constructed as to make it unnecessary to provide either of the contact surfaces of the nozzle and nipple of substantially parti-spherical form, which is so difficult to attain with sufficient preciseness in the practical manufacture of the device in quantities, and which is difficult to maintain in the use of the apparatus.

Another object of my invention is to provide an improved nozzle and nipple construction for lubricating apparatus of the contact type wherein improper excessive angular movements of the nozzle relative to the nipple will be arrested by interengaging non-sealing portions of the nozzle and nipple surfaces.

Another object of my invention is to provide an improved nozzle and nipple construction for lubricating apparatus of the contact type wherein improper excessive angular movements of the nozzle relative to the nipple will be arrested by interengaging non-sealing portions of the nozzle and nipple surfaces, and wherein knowledge of such arresting engagement indicating excessive angularity between the nozzle and nipple will be communicated to the operator through the sense of feeling independently of his visually observing the relative positions of the parts.

Other objects of my invention and the invention itself will be apparent to those skilled in the art to which my invention appertains from the following description of certain embodiments of my invention, and in which reference is had to the accompanying drawing illustrating the said embodiments.

In the drawing;

Fig. 1 is a longitudinal medial sectional view of a nozzle, with associated universal joint mechanism, of a lubricant gun, and a nipple operatively associated therewith embodying the principles of my invention;

Fig. 2 is an elevational view according to a reduced scale of the nipple of Fig. 1;

Fig. 3 is a view like that of Fig. 1 employing corresponding parts, which, in combination, are a second embodiment of my invention;

Fig. 4 illustrates in like view a fragment of the nozzle of Fig. 1 and an associated nipple of the elbow type having operating elements generally similar to those provided in the embodiment of my invention illustrated in Fig. 1;

Fig. 5 is a like view employing a nozzle like that of Fig. 1, in association with a modified form of nipples having operative elements generally corresponding to those of Fig. 1, the nipple being shown in elevation;

Fig. 6 is a like view of a nozzle element similar to that shown in Fig. 3 in association with a cooperating nipple of the elbow type, and Fig. 7 is a like view illustrating the nozzle of Fig. 3 in cooperative association with a modified form of nipple shown partially in elevation and partially in section.

Referring now, first, to the nozzle and universal joint mechanism therefor, preferably employed with nipples of varying types, some of which are illustrated in Figs. 1 and 2, 4 and 5, the nozzle 1 is tubular in form, having a dispensing mouth 2 at its one end and a nipple engaging shoulder 3 disposed within the mouth, said shoulder being provided by the junction of two successive sections of the longitudinal bore of the nozzle which, proceeding from the mouth opening 4 inwardly, are of successively reduced diameter.

The shoulder 3 has a nipple engaging edge which is longitudinally convexly rounded on centers preferably disposed approximately as indicated at 5, Fig. 1, to form a contact surface for making lubricant sealing contact with a convexly rounded surface, such as that shown at 6, of a lubricating nipple 7, Fig. 1. The inwardly disposed reduced section of bore 8 and the shoulder 3 with its said contact surface is provided by an annular flange 9 projecting inwardly from the lateral walls of the tubular nozzle element. An annular gasket 10 is seated on the inclined shoulder provided by the opposite face of the flange 9 and is held compactly thereagainst by pressure exerted on its outer surface by a parti-spherical longitudinally bored knob 11 which forms the terminal nose for a lubricant gun whose end 12, only, is indicated herein.

The part 12 may be integrally or separately secured to the end of the gun, within the purview of this invention. At 13 I provide an annulus rigidly secured onto the exterior of the nozzle 1, said annulus provided with a radial flange 14 for supporting a compression spring 15 interposed between said flange and a shoulder of the nose element 12. An inturned annular end 16 of the nozzle engages the parti-spherical nose 11, circumferentially beyond the portion of greatest transverse diameter to retain the knob secured within the tubular end of the nozzle, and with the cork, or other gasket 10, held compressed to effect a leak-proof connection between opposing surfaces of the knob and of the nozzle.

The longitudinal bore 17 of the nose is adapted to effect communication of lubricant from the gun to the nozzle bore portion 8 for communication therefrom to the nipple.

The nipple is of tubular form, having a stem 18 and an inlet tip 19 with an inlet opening 20 normally closed by a valve ball 21 pressed to seat with an inturned flange 22 at the end of the tip by a spring 23, within the tip bore, engaging said ball and an annulus 24 projecting inwardly from the nipple bore walls.

The exterior surface of the nipple tip adjacent to the threaded stem 18 of the nipple may be longitudinally fluted, as shown at 25, Fig. 2, for engagement by plier or wrench jaws to turn the nipple into a threaded opening of a bearing element, or may have a polygonal exterior, as shown at 25′, Fig. 5; in either event the inner surface of the enveloping tubular walls 26 of the nozzle will be suitably formed, either cylindrically, as shown in Fig. 1, to cooperate with the fluted generally annular surface 25 of the nipple of Figs. 1 and 2, or may be polygonal, as indicated for the enveloping nozzle portion 26 to cooperate with a polygonal outer surface 25′ of the nipple element.

In all cases, the annular surface including the inner end edge 27 of the nozzle mouth, is spaced from the portion of the adjacent lateral surface of the nipple inlet, such as 28, which is disposed close to the stem 18′ and relatively remote from the annular contact surface 6 of the nipple at the end of the tubular inlet thereof, and is engageable therewith when the nozzle is tilted angularly relative to the nipple, to arrest such tilting movements of the nozzle.

The nozzle engaging contact surface 6 of the nipple is of annular form, is convexly rounded in longitudinal sections, and is provided at the inlet end of the tip surrounding the inlet opening 20. The interengaging surfaces 3 and 6 of the nozzle and nipple are, therefore, preferably neither of parti-spherical form, but are each longitudinally convexly rounded on arcs whose radii are very much shorter than the radii of the annular surfaces of the nozzle and nipple contacting portions which are disposed in planes transverse to the longitudinal axes of the nozzle and nipple, respectively.

Such contacting surfaces, as provided, of preferably metallic material, may be inexpensively formed, and will cooperatively effect a good lubricant seal upon condition wherein manually effected longitudinal pressure is directed from the gun supporting the nose 11 onto the nozzle to press the contact surfaces together, and wherein the nozzle and nipple are not susceptible to relative angular positions, while their contact surfaces are in engagement, due to the portion 27 of the nozzle engaging with lateral portions 28 of the nipple tip, disposed remotely of its inlet end, as previously described.

Greater angularity between the lubricant gun nose 12 and the nipple 7 may be accomplished by the universal joint mechanism comprising the parti-spherical knob 11 oscillatable within the nozzle while in sealing engagement with the gasket 10.

The relations of the parts involved in the oscillation of the gun relative to the nipple are substantially the same as described in my said copending application, except that in the present case, as described, sealing contact between the nozzle and nipple is had within the nozzle remote from its mouth opening by an inlet end surface of the nipple.

In contrast with the apparatus of my copending application, also, excessive relative tilting of the nozzle and nipple elements per se, is herein prevented and the tendency thereto communicated to the operator through the sense of feeling, by interengaging portions of the nozzle and nipple, respectively, disposed at the mouth of the nozzle and the base of the tubular inlet tip.

Referring now to the embodiment of my invention shown in Fig. 4, this merely comprises an elbow nipple having a longitudinally bored body 29 into an angularly extending portion of the bore of which, disposed in its head, a stem 18′ of a nipple element, otherwise like that shown in Fig. 1, is projected either by screw threading it therein, or, preferably, as illustrated, by providing the stem with plain outer cylindrical surfaces and pressing it tightly within said bore.

Referring now more particularly to the embodiments of my invention illustrated in Figs. 3, 6 and 7, and first particularly to Figs. 3 and 7, lubricant sealing engagement is had between the contact surfaces of the nozzles and nipples of said embodiments by converging lateral surfaces 30 of an end recess of the nipple 7′, communicating centrally by an opening 20 with the interior of the tubular nipple, engaging the exterior longitudinally convexly rounded surface 31 of an annular tubular reentrant projection 32 of the end wall 33 of the nozzle mouth.

In the embodiment illustrated. the outer surface 31 of the reentrant tubular projection 32 is convexly rounded in longitudinal sections, preferably on radii which are about equal to one-half of the major radius of transverse curvature of the said contacting surface 31. The nipple contact surface 30 is preferably frustro-conical in form, although other variant forms operating substantially in the same way are not herein disclaimed.

In this embodiment also, the outer surface of the tubular inlet 19′, Fig. 3, and 19″, Fig. 7, are, respectively, longitudinally fluted and polygonal in form, as in the case of the previously described embodiment.

Fig. 6 illustrates an elbow nipple which is an embodiment of my invention having nozzle and nipple cooperating elements formed like those shown and described for Figs. 3 and 7, but wherein the nipple element is telescoped by its reduced stem into an angularly extending portion of the longitudinal bore of a tubular nipple body 29', in a manner substantially as described in connection with Fig. 4.

By the construction as provided herein, I am enabled to employ inexpensive nipples, without a hexagonal intermediate portion, employed alone for engagement by a wrench or the like, for installing or removing the nipple from an element of bearing.

Having thus described my invention in certain embodiments, I am aware that numerous and extensive departures may be made from the said embodiments, but without departing from the spirit of my invention.

I claim:

1. In lubricating apparatus, a lubricant coupler comprising a nozzle and a nipple, a lubricant communicating oscillatable joint mechanism joining the nozzle to a compressor, said nozzle having a terminal recess with lateral walls enveloping the nipple, and an end wall annular surface, said nipple having an annular surface at its inlet end engageable with said first annular surface throughout a plurality of relatively different angular positions of nozzle and nipple, and another lateral surface spaced from its inlet end making arresting engagement with the projecting lateral walls of the recessed nozzle, to limit said relative angular positions.

2. In a lubricant coupler, a nozzle terminating in a recessed end, a nipple having a threaded stem, an annular contact surface at its tip end, and an inlet opening within its contact surface, the end wall of the nozzle recess providing an annular shoulder engageable with the nipple contact surface, the lateral walls of the nozzle recess spaced slightly laterally of lateral wall surfaces of the nipple, longitudinally remotely spaced from its inlet opening, to arrest excessive angular movements of the nozzle relative to the nipple during a lubricating operation.

3. In a lubricant coupler, a nozzle terminating in a recessed end, a nipple having an annular contact surface at its tip end, and an inlet opening within its contact surface, the end wall of the nozzle recess providing an annular shoulder engageable with the nipple contact surface, the lateral walls of the nozzle recess spaced slightly laterally of lateral wall surfaces of the nipple, longitudinally remotely spaced from its inlet opening, a dispensing nose for a lubricant gun cooperating with said nozzle to form lubricant communicating universal joint mechanism supporting said nozzle on said nose.

4. In a lubricant coupler, a nozzle terminating in a recessed end, a nipple having an end recess provided with substantially frustro-conical lateral walls providing an annular contact surface, and an inlet opening within its contact surface, the end wall of the nozzle recess providing an annular shoulder engageable with the nipple contact surface, the lateral walls of the nozzle recess spaced slightly laterally of lateral wall surfaces of the nipple, longitudinally remotely spaced from its inlet opening.

5. In a lubricant coupler, a nozzle terminating in a recessed end, a nipple having an end recess provided with substantially frustro-conical lateral walls providing an annular contact surface, a tubular reentrantly projecting contact element for the nozzle disposed on the end wall of its recess, engageable with the nipple contact surface, the terminal end of the nozzle telescopically enveloping lateral walls of the nipple spaced therefrom and being adapted to engage therewith upon relative angular movement of the nozzle and the nipple for limiting excessive angular movement between the nozzle and nipple beyond that degree of angularity wherein leak-proof contact may be had between the contact element of the nozzle and the nipple contact surface.

In testimony whereof I hereunto affix my signature this 19 day of October, 1929.

OSCAR U. ZERK.